United States Patent
Spagnolo

(10) Patent No.: US 12,464,984 B2
(45) Date of Patent: Nov. 11, 2025

(54) PRUNING MACHINE

(71) Applicant: F & T Spagnolo Pty Ltd., Mildura (AU)

(72) Inventor: Fred Spagnolo, Mildura (AU)

(73) Assignee: F & T Spagnolo Pty Ltd., Mildura (AU)

( * ) Notice: Subject to any disclaimer, the term of this patent is extended or adjusted under 35 U.S.C. 154(b) by 924 days.

(21) Appl. No.: 17/753,441

(22) PCT Filed: Sep. 4, 2020

(86) PCT No.: PCT/AU2020/050928
§ 371 (c)(1),
(2) Date: Mar. 3, 2022

(87) PCT Pub. No.: WO2021/042168
PCT Pub. Date: Mar. 11, 2021

(65) Prior Publication Data
US 2022/0312683 A1   Oct. 6, 2022

(30) Foreign Application Priority Data
Sep. 6, 2019 (AU) .................................. 2019903294

(51) Int. Cl.
*A01G 3/08* (2006.01)
*B27B 5/10* (2006.01)

(52) U.S. Cl.
CPC ................ *A01G 3/088* (2013.01); *B27B 5/10* (2013.01)

(58) Field of Classification Search
CPC .... A01G 3/088; A01G 3/0408; A01G 17/023; B27B 5/10; B23D 45/105; B23D 45/003
See application file for complete search history.

(56) References Cited

U.S. PATENT DOCUMENTS

| | | | | | |
|---|---|---|---|---|---|
| 2,153,771 | A | * | 4/1939 | Orr ........................ | A01D 34/84 56/10.1 |
| 2,814,924 | A | * | 12/1957 | Group .................... | A01D 34/84 56/13.8 |

(Continued)

FOREIGN PATENT DOCUMENTS

| CN | 113748830 A | * | 12/2021 | ............. A01D 34/73 |
|---|---|---|---|---|
| CN | 116171708 A | * | 5/2023 | ............. A01D 34/74 |

(Continued)

OTHER PUBLICATIONS

International Search Report for International Patent Application No. PCT/AU2020/050928, mailed Nov. 10, 2020 (4 pages).

*Primary Examiner* — Arpad Fabian-Kovacs
(74) *Attorney, Agent, or Firm* — Woodard, Emhardt, Henry, Reeves & Wagner, LLP

(57) ABSTRACT

A pruning machine (12) for pruning vegetation growing on generally horizontal support wires. The pruning machine (12) includes a vertical shaft (22) mounted for rotation and at least one blade assembly (26) mounted on the shaft (22). The blade assembly (26) includes a plurality of blades (30) mounted to rotate with the shaft (22). The shaft (22) is threaded at least in the region where the blade assembly (26) is mounted. The vertical position of the blade assembly (26) on the shaft (22) is adjustable by an adjustment nut (56) which threadably engages the shaft (22) below the blade assembly (26) and which during adjustment, bears against the underneath of the blade assembly (26) so that rotation of the nut (56) upwardly of the shaft (22) raises the blade assembly (26) and rotation of the nut (56) downwardly allows the blade assembly to lower.

20 Claims, 4 Drawing Sheets

(56) References Cited

U.S. PATENT DOCUMENTS

| | | | | |
|---|---|---|---|---|
| 2,851,842 A * | 9/1958 | Harp | A01B 39/166 | |
| | | | 56/15.5 | |
| 3,429,112 A * | 2/1969 | Wells | F16D 7/025 | |
| | | | 464/45 | |
| 4,072,195 A * | 2/1978 | Carlson | A01D 34/84 | |
| | | | 172/123 | |
| 4,158,945 A * | 6/1979 | Burke | A01G 23/093 | |
| | | | 56/503 | |
| 4,302,922 A * | 12/1981 | Guerndt, Jr. | B23D 45/10 | |
| | | | 56/235 | |
| 4,733,525 A * | 3/1988 | Pellenc | A01G 3/0426 | |
| | | | 56/235 | |
| 5,669,213 A * | 9/1997 | Britton | A01D 34/005 | |
| | | | 56/DIG. 17 | |
| 5,737,908 A * | 4/1998 | Andelfinger | A01G 3/08 | |
| | | | 144/34.1 | |
| 5,791,129 A * | 8/1998 | Pellenc | A01G 3/0408 | |
| | | | 56/331 | |
| 6,055,798 A * | 5/2000 | Fulmer | A01D 34/733 | |
| | | | 56/DIG. 17 | |
| 6,523,337 B2 * | 2/2003 | Spagnolo | A01G 17/02 | |
| | | | 56/15.5 | |
| 6,666,009 B1 * | 12/2003 | Brandon | A01D 34/4166 | |
| | | | 30/276 | |
| 8,230,671 B2 * | 7/2012 | Pellenc | A01G 3/0408 | |
| | | | 56/235 | |
| 10,349,576 B1 | 7/2019 | Jones | | |
| 11,679,443 B1 * | 6/2023 | Steensma | A01D 34/733 | |
| | | | 30/392 | |
| 2002/0040571 A1 | 4/2002 | Scott et al. | | |
| 2002/0043061 A1 | 4/2002 | Spagnolo | | |
| 2006/0162309 A1 | 7/2006 | Schloesser | | |
| 2006/0230733 A1 | 10/2006 | Fenton | | |
| 2009/0090093 A1 * | 4/2009 | Pellenc | A01G 3/0408 | |
| | | | 56/10.2 G | |
| 2009/0223195 A1 | 9/2009 | Goguelet et al. | | |
| 2014/0000232 A1 * | 1/2014 | Andros | A01G 3/0408 | |
| | | | 56/235 | |

FOREIGN PATENT DOCUMENTS

| | | | | |
|---|---|---|---|---|
| EP | 1541009 A1 | 6/2005 | | A01G 17/02 |
| EP | 2382860 A1 * | 11/2011 | | A01G 17/02 |
| FR | 1591146 A * | 4/1970 | | A01G 3/0408 |
| FR | 2439542 A1 * | 5/1980 | | A01G 3/0408 |
| FR | 2927766 A1 * | 8/2009 | | A01G 17/02 |
| SU | 908281 A1 * | 2/1982 | | A01G 17/02 |

* cited by examiner

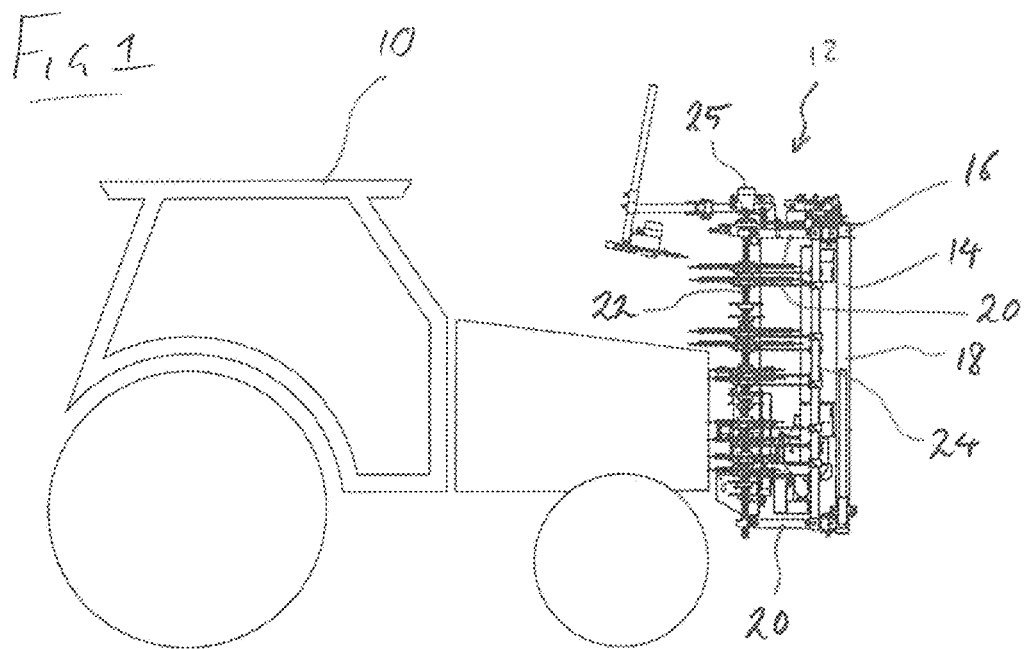
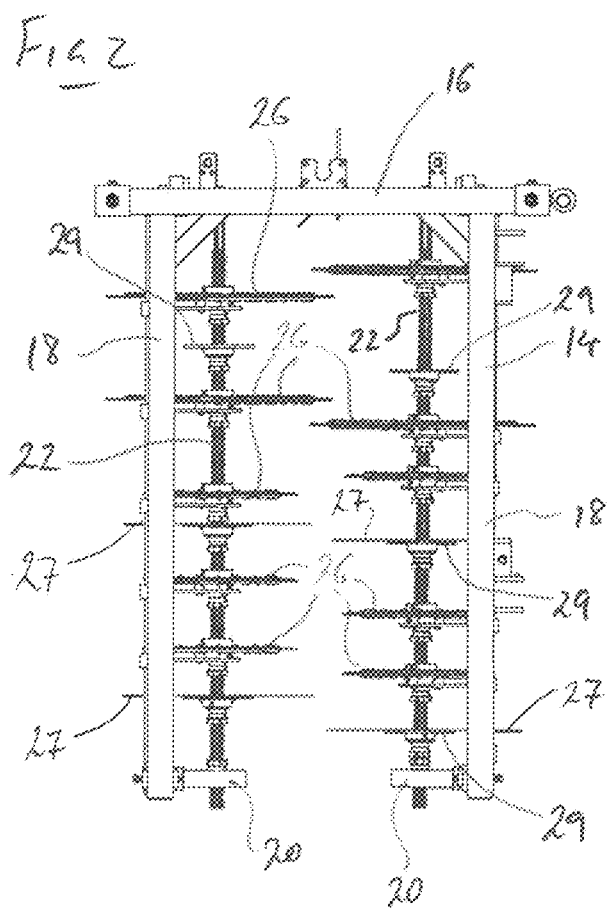
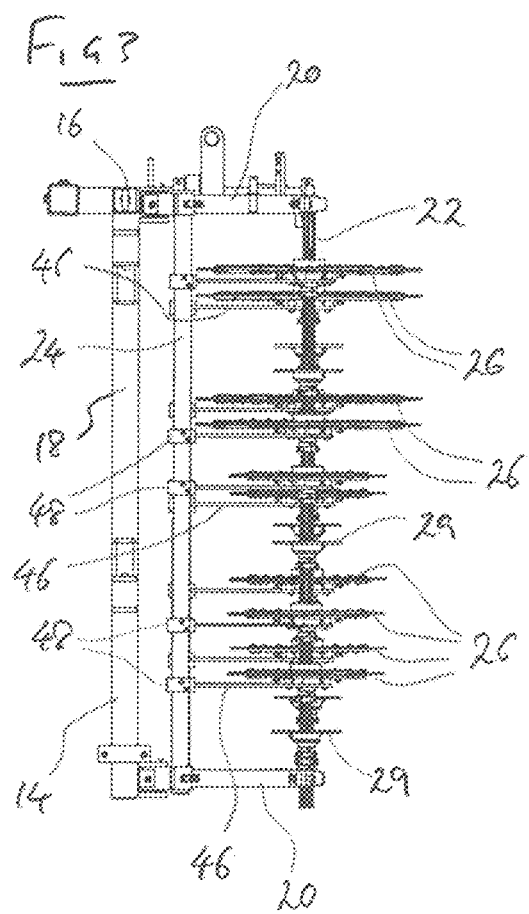

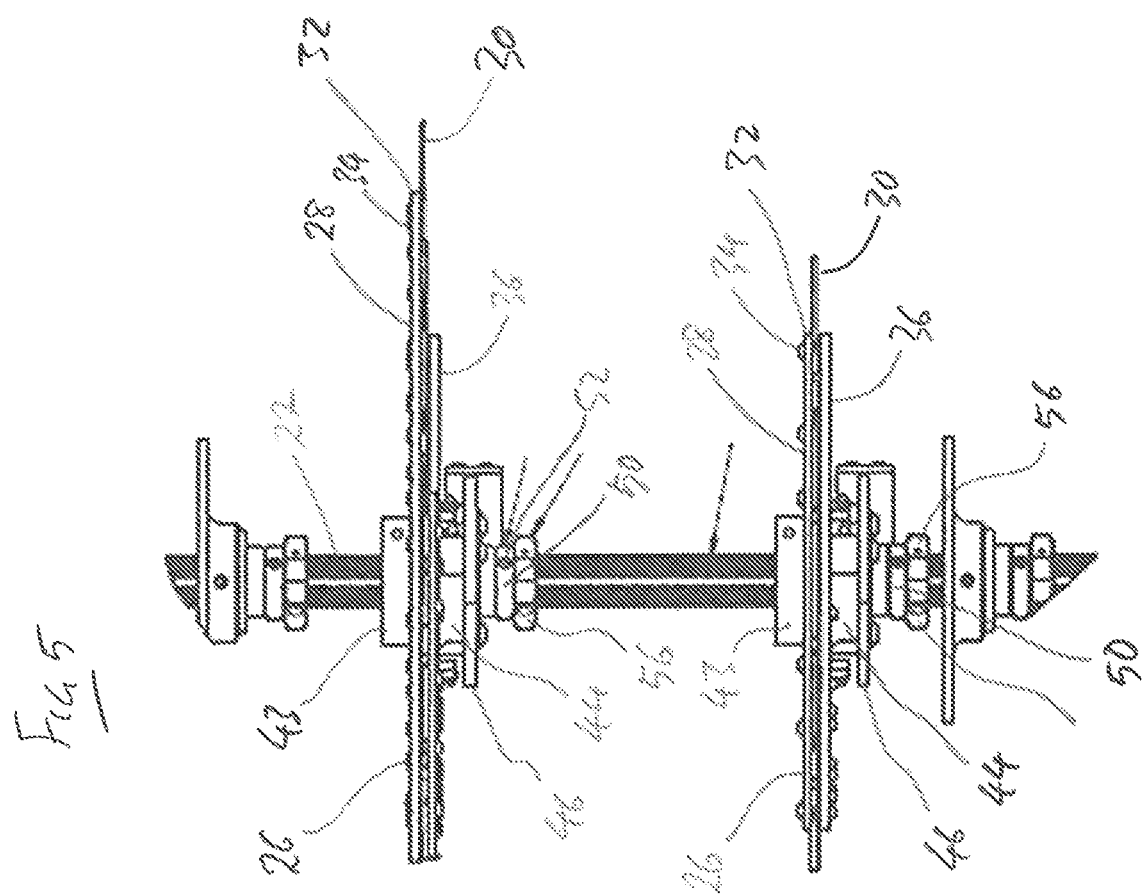
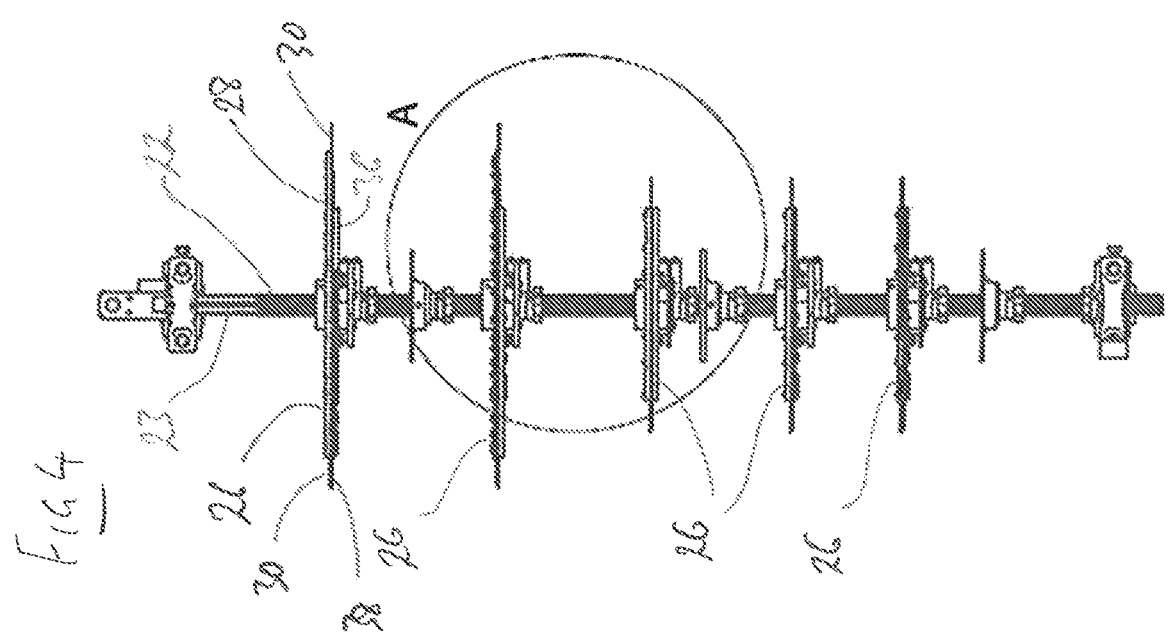

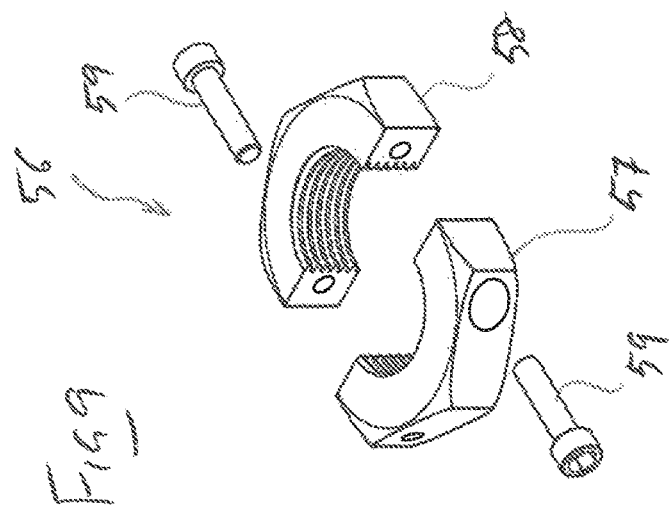
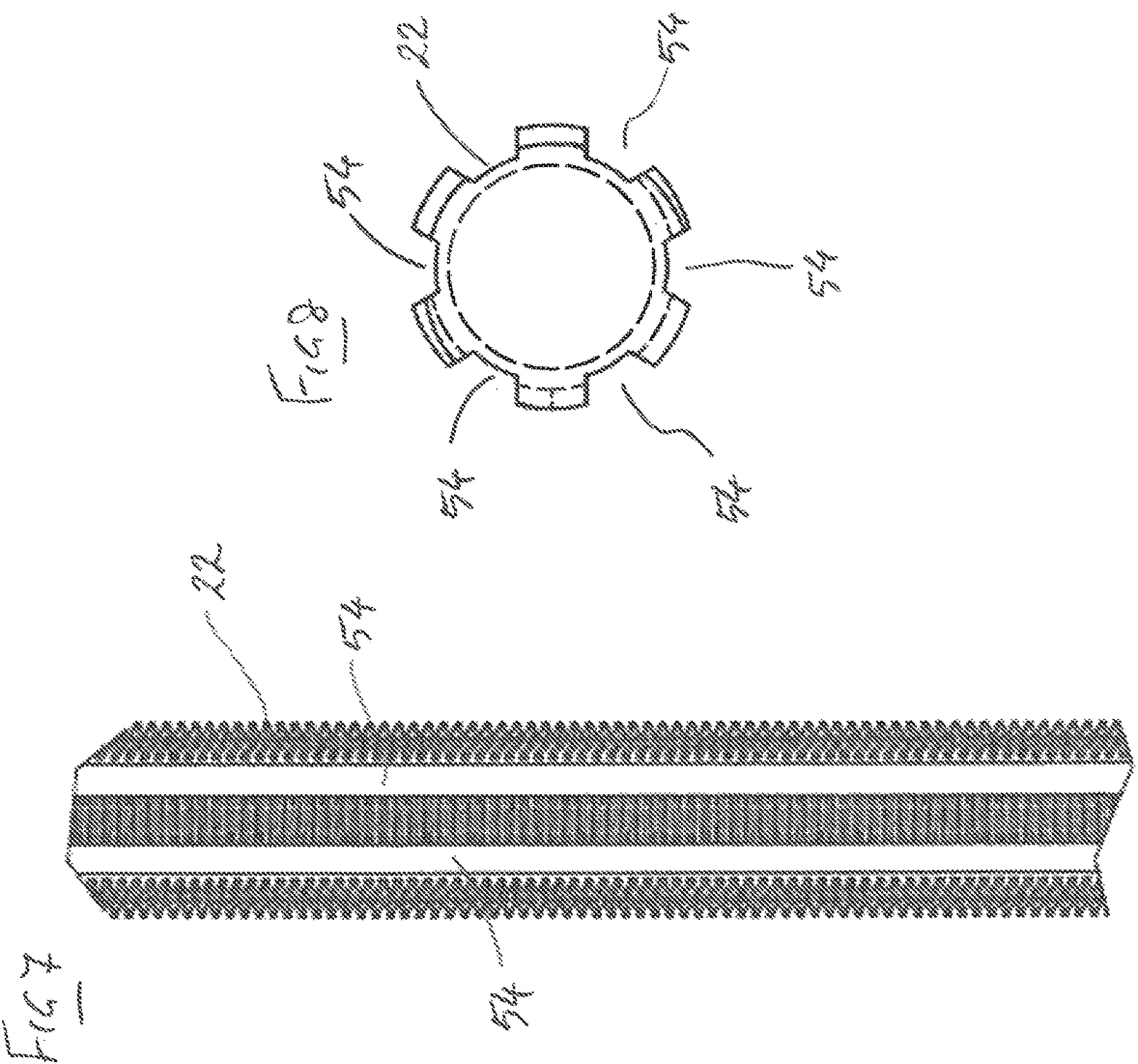

PRUNING MACHINE

PRIORITY CROSS-REFERENCE

The present application claims priority from Australian Provisional Patent Application No. 2019903294 filed 6 Sep. 2019 the contents of which is to be considered to be incorporated into this specification by this reference.

TECHNICAL FIELD

The present invention relates to a pruning machine and has been developed principally, but not exclusively for pruning trellised grape vines. The pruning machine of the invention is intended to be mounted to a tractor or the like, but the invention also extends to a tractor or other vehicle which incorporates a pruning machine according to the invention.

BACKGROUND OF INVENTION

Grape vines are required to be pruned usually once a year. Pruning takes place after the fruit of the vines has been harvested but before new season vine growth commences. Thus, pruning usually takes place during a period in which the vines are substantially dormant. Pruning at the appropriate time can result in subsequent improved production of fruit from the vine. Moreover, the quality of the pruning can also have an effect on the subsequent quality and quantity of the fruit subsequently produced.

Manual pruning of vines is a time consuming and labour intensive process, particularly for large scale vineyards. Even where manual pruning is preferred, access to workers able to prune on a large scale is problematic and if available, costly. Accordingly, machines have been developed to prune vines. These machines are intended to prune at a much faster rate than available by manual pruning in order to provide significant increases in overall efficiency.

While the structure of trellised vines has made mechanical pruning difficult, pruning machines have been developed that provide acceptable pruning outcomes. In particular, the pruning machine previously developed by the present inventor and which is the subject of U.S. Pat. No. 6,523,337, has achieved wide acceptance in marketplaces in Australia and the US.

The pruning machine of U.S. Pat. No. 6,523,337 included a pair of vertical shafts on which cutting blades were mounted. The respective shafts would be positioned on either side of a trellised vine and would be driven along the length of the vine with the blades of the respective shafts engaging the vine growth to be pruned. The vine growth to be pruned is normally the "canes" which extend from the "cordons" of the vines. Importantly, the shafts were movable inwardly and outwardly relative to the vine, so that when the blades approached the main trunks of the vines, the shafts would move outwardly or separate, so that the blades would not engage the main trunks. Critically, this allowed the pruning machine of U.S. Pat. No. 6,523,337 to avoid damage to the main trunks and cordons, which otherwise could reduce the subsequent fruit harvest from the damaged vine, or could even cause the vine to die.

Likewise, the separating movement of the shafts allowed the blades to avoid engagement with posts that supported the trellising wires and that could otherwise cause damage to the blades.

The blades mounted to the shafts are mounted at positions suitable to engage the vine growth to be pruned. Blades could be mounted for example above an upper trellis wire to prune vine growth above the wire, and further blades could be mounted below the upper trellis wire to prune vine growth below the trellis wire. It is common for a pair of generally horizontal and parallel trellis wires to be spaced apart vertically for supporting vine growth along each of the wires. In these trellis arrangements, a pair of blades can be mounted between the vertically spaced wires to prune vine growth that extends downwardly from the upper wire and upwardly from the lower wire. This can be in addition to blades that are mounted above the upper wire and below the lower wire.

There is no generally accepted standard for the dimensional layout of trellis wire in vineyards. The height of trellis wire above the ground varies from vineyard to vineyard as does the spacing of wires in trellising employing two or more generally horizontal and parallel wires. The layout of the trellis wire is at the preference of the installer and can vary legitimately based on the type of vines being trellised, and the geography of the location of installation. Accordingly, before a pruning machine is used at a new vineyard, it is normal for the blades to be repositioned or adjusted on the shafts in order to suit the particular trellising of the vineyard. Moreover, trellising layout might vary at different locations within a vineyard, such as where the grape variety being grown changes, or where the geography of the land changes. In these circumstances, the position of the blades on the shafts as previously set might need to be adjusted.

The pruning machine of U.S. Pat. No. 6,523,337 allows adjustment of the position of the blade assemblies on the shafts by loosening the fixing arrangements employed and by lifting or lowering the blade assemblies to the new or adjusted position and then re-tightening the fixing arrangements to secure the blade assemblies in the new position. While this adjustment is effective and relatively simple, the blade assemblies are reasonably heavy and bulky and consequently, adjustment often requires at least two personnel to bear the weight of the blade assembly and to keep it aligned on the shaft against jamming, and to subsequently secure it in the new position. The position of the blade assemblies on the shaft can also make adjustment difficult given that the blade assemblies can be high or low or on the shaft. The adjustment process is therefore not often easy. Moreover, handling of the blade assemblies often brings personnel into contact with the blades of the assemblies posing the potential for laceration of the hands and arms. The present applicant has therefore sought to provide an improved arrangement for adjustment of the position of a blade assembly on the shaft of a pruning machine.

The above discussion of the background to the invention is intended to facilitate an understanding of the invention. However, it should be appreciated that the discussion is not an acknowledgement or admission that any aspect of the discussion was part of the common general knowledge as at the priority date of the application.

SUMMARY OF THE INVENTION

In a broad form of the invention there is provided a pruning machine for pruning vegetation growing on generally horizontal support wires, the machine including a vertical shaft mounted for rotation and at least one blade assembly mounted on the shaft, the blade assembly including a plurality of blades mounted to rotate with the shaft, the vertical shaft being threaded at least in the region where the blade assembly is mounted, the vertical position of the blade assembly on the shaft being adjusted by an adjustment nut which threadably engages the threaded shaft below the blade assembly and which during adjustment, bears against the underneath of the blade assembly so that rotation of the nut upwardly of the shaft raises the blade assembly and rotation of the nut downwardly allows the blade assembly to lower.

In a more specific form of the invention, there is provided a pruning machine for pruning vegetation growing on generally horizontal support wires, the machine including a pair of vertical shafts which are spaced apart laterally for positioning on either side of the vegetation to be pruned, each of the shafts being mounted for rotation and each of the shafts including at least one blade assembly mounted on the shaft in vertically spaced relationship, each blade assembly including a plurality of blades mounted to rotate with the shaft, the vertical shafts being threaded at least in the region where the blade assemblies are mounted, and an adjustment nut being threadably mounted to the threaded region beneath each blade assembly, the vertical position of the blade assemblies on the shaft being adjusted by rotating the adjustment nut against the underneath of the blade assembly so that rotation of the nut upwardly of the shaft raises the blade assembly and rotation of the nut downwardly allows the blade assembly to lower.

Pruning machines of the above forms facilitate height adjustment of a blade assembly relative to the shaft on which it is mounted by rotation of the adjustment nut. Advantageously, this allows adjustment to be made without requiring the weight of the blade assembly to be separately supported. That is, the weight of the blade assembly is supported by the adjustment nut as the blade assembly is raised or lowered and so manual support of the blade assembly is not required. Moreover, the adjustment nut can be rotated by a wrench, spanner or the like in which mechanical advantage can be provided through the length of the handle of the wrench or spanner. Thus, even a very heavy blade assembly can be easily raised or lowered when the handle of the wrench or spanner is sufficiently long.

It follows that by the use of the invention, the requirement for at least two personnel to be present to adjust the position or height of a blade assembly on the shaft is no longer necessary. The weight of the blade assemblies is supported by the adjustment nut and the awkwardness in handling the blade assemblies manually given their size is removed because lifting and lowering is achieved by rotation of the adjustment nut clockwise or anti-clockwise. The blade assemblies are unlikely to jam because lifting and lowering occurs centrally of the assembly rather than at the edges of the assembly. Moreover, because the edges of the blade assemblies are not engaged by personnel, laceration by contact with the blades of the assemblies is also avoided.

Because of the reduction in effort to make an adjustment, field adjustment is now possible without requiring a return to the workshop or without requiring additional personnel travelling to the pruning machine to assist with the adjustment. This means that pruning of vines is more likely to be customised to the particular vines being pruned as adjustment can be made quickly and easily and so is more likely to be made when required in the field.

The Applicant considers these advantages to be significant and despite the seeming simplicity of the invention, the development that has led to the invention has been significant, with many more complex adjustment arrangements being proposed before the present invention was developed. Importantly, prior art shafts were not threaded and so the application of an adjustment nut to the shaft was not immediately apparent as a solution to try. Moreover, the application of a thread to a long shaft of the kind used in pruning machines has not heretofore been contemplated.

A pruning machine according to the invention will typically have at least two blade assemblies mounted on the shaft and an adjustment nut can be located beneath each of the blade assemblies. In other forms of the invention, there will be four or more blade assemblies mounted on the shaft and an adjustment nut can be located beneath each of the blade assemblies.

A pruning machine according to the invention will typically have a pair of vertical shafts which are spaced apart laterally for positioning on either side of the vegetation to be pruned. Each of the shafts will be mounted for rotation and they will each typically have at least two blade assemblies mounted in vertically spaced relationship. Where the pruning machine is pruning grape vines that are supported along a single support wire, a pair of blade assemblies can be spaced apart above and below the support wire. Alternatively, where the pruning machine is pruning grape vines that are supported along pair of vertically spaced apart, generally horizontal and parallel support wires, blade assemblies can be spaced apart above and below each of the support wires. Additional blade assemblies can be provided as required.

Alternative arrangements include four vertical shafts with two of the shafts extending downwardly from an upper part of the pruning machine and the other two shafts extending upwardly from a lower part of the pruning machine. Each of the four shafts can be driven independently of the others. The four shafts can form pairs of vertically aligned or axially aligned shafts. Each of the four shafts can support one or more blade assemblies.

The blade assemblies can have any suitable construction. For example, the plurality of blades of each blade assembly can be provided about the edge of a disc. These can be integral with the disc, or can be attached to the disc, such as by rivets or screws. The blades can be similar to or the same as those provided for cutting through timber, e.g. a circular saw blade.

The blade assemblies can comprise a single disc and thus a single set of blades, or multiple discs and thus multiple sets of blades. Accordingly, blade assemblies suitable for pruning grape vines can comprise a first set of blades that rotate in a first plane and a second set of blades that are stationary in a second plane relative to the first set. The first and second planes are parallel and closely adjacent and the first set of blades can overlie the second set of blades, or vice versa, i.e. the second set of blades can overlie the first set of blades. In this arrangement, the first set of blades can be rotated relative to the second set of blades creating a scissor action between the blades to cut vine vegetation that enters the space between the blades.

The first set of blades can be connected to a first rotatable pruning plate and the blades can protrude radially from the periphery of the plate. The second set of blades can be connected to a second stationary pruning plate and the second set of blades can protrude radially from the periphery of that plate. The respective pruning plates can be mounted on the shaft coaxially. The blades of the respective pruning plates can be of substantially the same configuration.

The first plate can be connected to the shaft to rotate with the shaft when the shaft rotates. The first plate can include a retaining collar that can clamp onto the shaft to secure the first plate to the shaft. In some forms of the invention, a split collar is employed as the retaining collar. A split collar includes a radial split that allows the collar to open for loosening or to close for tightening. Closure of the split is by way of a circumferential or tangential extending bolt. A split collar advantageously allows quick loosening for adjustment of the position of a blade assembly and thereafter quick tightening once the adjusted position has been reached.

The second plate can have a central bearing through which the shaft extends so that the bearing rotates with the shaft, but the second plate can remain stationary, or in other words, will not rotate. The second plate can connect to an arm that extends to a structural part of the pruning machine, so that the second plate does not rotate. Other arrangements to retain the second plate stationary or against rotation can be employed.

A retaining collar can underlie the second plate to support the second plate in positon on the shaft. The retaining collar can be fixed to the shaft so that it rotates with the shaft when the shaft rotates and it can bear against an underneath surface of the central bearing so that it rotates with the central bearing when the shaft rotates. The retaining collar supports the second plate against downward movement on the shaft.

In the above form of the invention, the adjustment nut can be threaded onto the shaft beneath the retaining collar and when adjustment of the position of the blade assembly on the shaft is required, the adjustment nut can be rotated clockwise or anti-clockwise against a facing surface of the retaining collar to lift or lower the blade assembly. For this, it is necessary to remove or loosen any parts of the blade assembly that would hinder movement of the blade assembly up or down the shaft, such as the split collar and the retaining collar described above (if employed).

In alternative arrangements, the adjustment nut can underlie the second plate and can bear against an underneath surface of the central bearing so that it rotates with the central bearing when the shaft rotates. In this arrangement, the adjustment nut supports the second plate against downward movement on the shaft. A retaining collar can underlie the adjustment nut, in bearing engagement against an underneath surface of the adjustment nut, to prevent the adjustment nut from rotating on the thread of the shaft, when not intended.

The adjustment nut can be left in place on the shaft and an adjustment nut can be provided for or associated with each blade assembly of the shaft. The adjustment nut can thus take the form of a standard hex nut or a square nut for example. Alternatively, the adjustment nut can be removable so that it can be removed and repositioned on the shaft when required to adjust the position or height of any of the blade assemblies of the pruning machine. The adjustment nut can thus be formed in two connectable parts and can be connected together such as by a pair of circumferential or tangential extending bolts.

Thus, the adjustment nut can be used only when adjustment of the position or height of a blade assembly is required, so that the adjustment nut is not used for supporting the blade assembly vertically, or the adjustment nut can be used both to support the blade assembly on the shaft as well as to adjust the position of the blade assembly on the shaft.

In addition, while some of the arrangements discussed above describe that the second plate underlies the first plate and that the adjustment nut engages the second plate, it is, as indicated above, within the scope of the present invention that the first plate underlies the second plate, so that the adjustment nut engages the first plate directly or indirectly.

The shaft can be threaded just in sections where blade assemblies are to be mounted or alternatively, the shaft can be threaded substantially along its full length, other than at each end. Suitable forms of thread include V or ACME threads.

The shaft can have any suitable form. In some forms, the shaft can be a round shaft that is threaded along sections of its length or along substantially its full length and the shaft can include a non-round end for driving. Alternatively, the shaft can be a round threaded shaft that includes a flat or a keyway for driving. Alternatively, the shaft can be a threaded hexagonal or square shaft. Thus, the shaft can have any suitable form that has a thread for the adjustment nut to engage and that is arranged for driving for the purpose of rotating the shaft.

BRIEF DESCRIPTION OF DRAWINGS

In order that the invention may be more fully understood, some embodiments will now be described with reference to the figures in which:

FIG. 1 is a perspective view of a pruning machine for pruning grape vines as attached to a tractor, according to one embodiment of the invention.

FIG. 2 is a front view of the pruning machine of FIG. 1.

FIG. 3 is a side view of the pruning machine of FIG. 1.

FIG. 4 is a view of one part of the pruning machine of FIG. 1.

FIG. 5 is a view of a section of the part shown in FIG. 4.

FIGS. 7 and 8 are side and end views of the shaft used in the part shown in FIG. 4.

FIG. 9 shows an adjustment nut for use in the pruning machine of FIG. 1.

DETAILED DESCRIPTION

Figure 6:
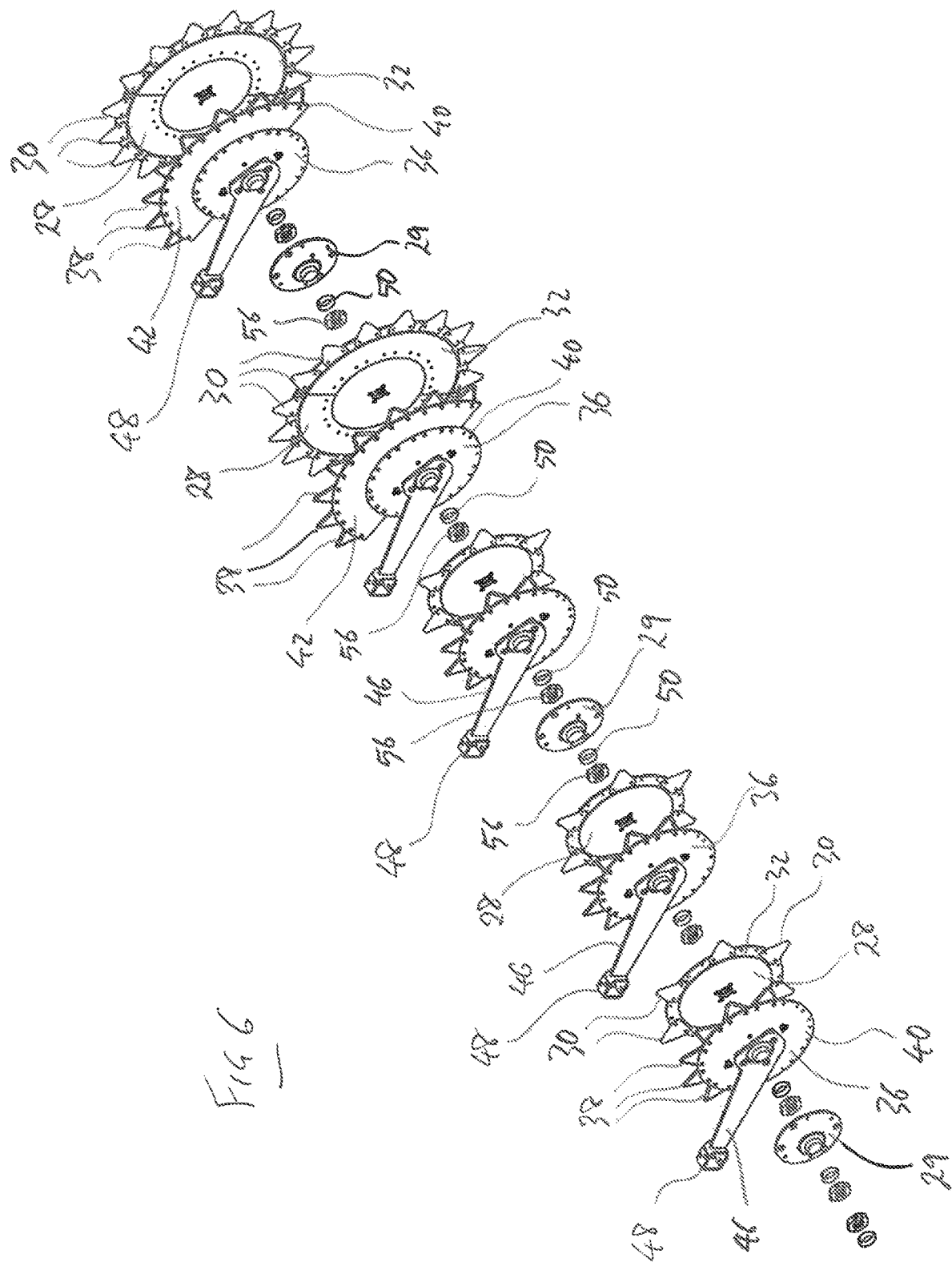
FIG. 6 is an exploded view of the part shown in FIG. 4.

FIG. 1 is a side view of a tractor 10 (schematically represented) which has a pruning machine 12 according to the present invention attached to the front end thereof. The attachment can be in any suitable manner. While the pruning machine 12 of the present invention differs from the machine disclosed in U.S. Pat. No. 6,523,337, many aspects of the pruning machine 12 are the same as the machine disclosed in U.S. Pat. No. 6,523,337. Thus, the disclosure of U.S. Pat. No. 6,523,337 is included herein by cross-reference.

The pruning machine 12 of FIG. 1 is shown front view in FIG. 2, which is a view of the pruning machine 12 of FIG. 1 looking back towards the tractor 10. FIG. 3 shows the pruning machine 12 in isolation from the tractor 10 but in the same side view as FIG. 1.

FIG. 2 illustrates that the pruning machine 12 includes a frame 14 that has a cross member 16 and a pair of uprights 18 connected to the cross member 16. Arms 20 (only the bottom arms 20 are visible in FIG. 2) extend from the frame 14 to support opposite ends of two vertically extending threaded shafts 22. Also supported are upright square posts 24 (see FIG. 3). As shown in FIG. 1, in relation to the tractor 10, the uprights 18 are spaced furthest away from the front of the tractor, while the vertical shafts 22 and the posts 24 are between the uprights 18 and the front of the tractor 10.

The vertical shafts 22 are driven to rotate during a pruning operation. Hydraulic motors 25 (see FIG. 1) can be used for this purpose. A hydraulic motor can conveniently be driven from a power pack run from the power take-off (PTO) of the tractor 10, or from the tractor hydraulics.

The vertical shafts 22 support a plurality of individual blade assemblies 26 that are spaced apart along the length of the shafts 22. The blade assemblies 26 are spaced apart to suit the vines being pruned and so the blade assemblies 26 can be repositioned on the shafts 22 as required for the particular vines under pruning.

The bottom three blade assemblies 26 have an equal and smaller outside diameter than the upper two blade assemblies 26. The smaller diameter lower blade assemblies 26 are assemblies that are positioned below the upper cordon of the vine and so these assemblies 26 will encounter the trunks of the vines as well as the posts that support the trellising and the trunks and the posts present as obstacles to the passage of the assemblies 26 along a trellised vine. The pruning machine 12 thus allows the arms 20 to pivot against a bias relative to the uprights 18 so that the shafts 22 and thus the blade assemblies 26 can move apart when an obstacle such as a trunk or post is encountered. Do to this, free spinning wheels 27 are mounted on the shafts 22 and the wheels have a greater outer diameter than the smaller diameter lower blade assemblies 26, so the wheels 27 engage any obstruction before the blade assemblies 26. When the wheels 27 engage an obstruction, they freely roll around the obstruction causing the shafts 22 to shift outwardly so that the blade assemblies 26 do not engage the obstacle. Several wheels 27 are shown attached to free spinning discs 29. The free spinning discs 29 are mounted to the shaft 22 to rotate relative to the shaft 22 and the free spinning wheels 27 are removably attached to the discs 29 to allow wheels 27 to be replaced as required.

The larger diameter upper blade assemblies 26 also move apart when the wheels 27 engage an obstacle, but the larger diameter blade assemblies 26 are assemblies that are positioned above the uppermost cordon of the vine being pruned and so these upper blade assemblies do not encounter vine trunks or supporting posts. These blade assemblies can thus have a diameter that overlaps when the shafts 22 are not shifted apart as well as when the shafts 22 do move apart upon the wheels 27 encountering an obstacle. The overlap is preferred for optimal pruning and while it is reduced as the blade assemblies move apart, in the arrangement illustrated, the overlap is nevertheless always maintained.

Two upper blade assemblies 26 are illustrated in the figures and these provide two points of pruning for canes that extend upwardly from the uppermost cordon. Alternative arrangements can include just one upper blade assembly. What this shows is that the number of blade assemblies can vary and is determined by the operator's requirements.

Despite the difference in diameter between the upper and lower blade assemblies 26, each blade assembly 26 is constructed in generally the same manner. FIG. 4 shows one of the shafts 22 and the associated blade assemblies 26 of the earlier figures, while FIG. 5 shows an enlarged section of the FIG. 4 illustration at A. FIG. 6 is an exploded view of the blade assemblies 26 associated with a shaft 22 with the shaft 22 removed. In FIG. 4, the top end 23 of the shaft 22 is shown unthreaded, while the remaining length of the shaft 22 is threaded.

With reference to FIGS. 4 to 6, each blade assembly 26 comprises an upper circular pruning plate 28 that has a plurality of blades 30 protruding radially from the periphery 32 of the plate and a lower pruning plate 36. The upper circular pruning plate 28 is rotatable with the shaft 22 on which it is mounted. The blades 30 have a triangular configuration with the base of the blades 30 being connected to the plate 26 (such as by rivets or screws 34). Each blade assembly 26 further includes a lower pruning plate 36 that also has a plurality of triangular blades 38 connected to and protruding radially from the periphery 40 of the plate. The lower pruning plate 36 remains stationary relative to the shaft 22 on which it is mounted and the upper pruning plate 28 when the shaft 22 rotates.

The lower pruning plate 36 of the blade assemblies 26 only requires blades 30 to be provided along a semi-circular arc because the plate 36 only needs blades that face the vine vegetation being pruned. This is in contrast with the plate 28 that rotates and that thus requires blades 30 fully about its periphery.

The larger diameter of the upper blade assemblies 26 is formed by attaching a semi-circular disc 42 to the central plate 36 and attaching the blades 38 to the periphery 40 of the disc 42. For the smaller diameter lower blade assemblies 26, the blades 38 can be attached directly to the periphery 40 of the central plate 36. The plates 36 of the smaller diameter lower blade assemblies 26 are circular, but the blades 38 attached to the plates 36 are only attached along a semi-circular arc of the periphery 40 of the plates 36.

The upper plate 28 is fixed to the shaft 22 and rotates with the shaft 22 when the shaft 22 is driven to rotate. The upper plate 28 includes a splined collar 43 (see FIG. 5) which fixes the upper plate 28 to the shaft 22. The splined collar 43 engages the shaft 22 by clamping and is formed with a split that allows the collar 43 to be loosened on the shaft 22 for raising or lowering the collar 43 and the plate 28. That is, with the collar 43 attached to the shaft 22 but not fully tightened, the collar 43 can be moved up or down the shaft which also raises or lowers the upper plate 28. The plate 28 can be connected to the collar 43 by bolts for example.

The lower plate 36 includes a central bearing 44 (see FIG. 5) through which the shaft 22 extends so that the shaft 22 can rotate relative to the lower plate 36 and so the lower plate 36 can remain stationary relative to the upper plate 28. To retain the lower plate 36 stationary, an arm 46 (see FIG. 3) connects to an underside of the bearing housing of the bearing 44 and extends to the post 24 so preventing rotation of the lower plate 36. The arm 46 connects to the post 24 by a sleeve 48 (see FIGS. 3 and 6). The sleeve 48 is a square sleeve to fit closely about the square post 24 but the fit is such to allow the sleeve 48 to slide up or down the post 24 when adjustment of the position on the shaft 22 of the blade assembly 26 with which the arm 46 is associated is required. The sleeve 48 is formed from two U sections that are connected together by screws once the two U sections are fitted about the post 24.

A retaining collar 50 is attached to the shaft 22 below the lower plate 36. The arm 46 has a central opening so that the retaining collar 50 can bear against the rotatable inner ring or race of the central bearing 44 of the lower plate. The retaining collar 50 can thus rotate with the shaft 22 and with the inner ring of the bearing 44 of the lower plate 36, but the retaining collar 50 provides support for the lower plate 36 to maintain the selected position of the lower plate 36 on the shaft 22. The retaining collar 50 can be fixed to the shaft in any suitable manner and in the illustrated arrangement, grub screws 52 are employed to extend through threaded openings in the collar 50 and into engagement with the shaft 22. For this arrangement, the shaft 22 can be splined through the thread as shown in FIGS. 7 and 8 so that entry of the grub screw into a spline 54 of the shaft 22 can not only locate the retaining collar 50 vertically on the shaft 22, but will also locate the collar 50 against rotation (such as rotational creep) about the shaft 22. One or two grub screws 52 have been found to be sufficient to properly locate the retaining collar 50 on the shaft 22.

An adjustment nut 56 is threadably mounted to shaft 22 beneath the retaining collar 50. The adjustment nut 56 is provided to facilitate raising or lowering the upper and lower plates 28 and 36 and thus raising or lowering a blade assembly 26. For this, the adjustment nut 56 can be threaded into engagement with a facing surface of the retaining collar 50 and with the retaining collar 50 loosened by loosening of the or each grub screw 52, and with the collar 43 of the upper plate 28 also loosened, threaded rotation of the adjustment nut 56 on the shaft 22 will either raise the blade assembly 26, or lower it.

It is to be noted that while the figures show the adjustment nut 56 threadably mounted to shaft 22 beneath the retaining collar 50, it is also acceptable for the nut 56 to be mounted between the lower plate 36 and the retaining collar 50, so that it is the nut 56 that bears against the rotatable inner ring of the central bearing 44 of the lower plate. In that arrangement, the nut 56 supports the lower plate 36 against downward movement on the shaft 22 and the retaining collar 50 bears against an underneath surface of the nut 56, to prevent the adjustment nut 56 from rotating on the thread of the shaft 22.

The use of the adjustment nut 56 for adjustment of the position or height of a blade assembly 26 on the shaft 22 provides a very simple solution to what can otherwise be a difficult activity, usually requiring at least two personnel to effect the position or height change. The requirement for at least two personnel is driven by the weight of the blade assemblies 26 that needs to be supported when the retaining collar 50 is loosened and by the awkwardness in handling the blade assemblies 26 given their size and often also, the high or low position of the blade assemblies 26 on the shaft 22. The lower blade assemblies 26 illustrated in FIGS. 2 to 4 have a weight and a diameter of approximately 18 kg and 450 mm respectively, while the upper blade assemblies 26 weigh approximately 34 kg and are of about 650 mm in diameter. Moreover, lifting the blade assemblies 26 manually requires the assemblies 26 to be maintained generally perpendicular to the shaft 22 so that the assemblies 26 do not jam on the shaft 22. This means that usually, two personnel are required to stand on opposite sides of a blade assembly and to lift or lower the assembly the same amount together. Lowering the blade assemblies 26 is usually easier than raising them, but the weight of the assemblies still means that appropriate personnel need to be available to support the assemblies from falling and subsequent damage.

Another issue associated with adjusting the position or height of a blade assembly 26 on the shaft 22 is the presence of the sharp blades 30 and 38 that project from the blade assemblies 26. The personnel involved in adjusting the position or height of a blade assembly 26 on the shaft 22 need to be very careful not to be lacerated by the blades during the adjustment process.

The present invention alleviates the issues discussed above with the present adjustment process, by facilitating attachment of the adjustment nut 56 to the shaft 22 below the retaining collar 50 and thereafter using a wrench or spanner to rotate the nut 56 in engagement with the collar 50 clockwise or anti-clockwise, depending on whether the blade assembly 26 is to be raised or lowered. All that is required before the adjustment nut 56 is rotated is that the collar 43 and the retaining collar 50 be loosened. In this state, the weight of the blade assembly 26 is supported in position on the shaft 22 by adjustment nut 56, so that rotation of the adjustment nut 56 to raise or lower it on the shaft 22 will likewise raise or lower the blade assembly 26.

Advantageously, because the blade assembly 26 is raised by the adjustment nut 56, jamming of the blade assembly 26 on the shaft 22 will not occur because the blade assembly will not be tilted out of perpendicular alignment with the shaft 22. Moreover, length of the arm of the wrench or spanner can be such as to provide significant mechanical advantage, so that the adjustment process does not require great strength and thus can be undertaken by one person, while the personnel making the adjustment can keep distanced from the blades 30 and 38, thus providing additional safety. Adjustment in the field is now possible without requiring a return to the workshop or without requiring additional personnel travelling to the pruning machine 12 to assist with the adjustment. This means that pruning of vines is more likely to be customised to the particular vines being pruned as adjustment can be made quickly and easily and so is more likely to be made when required in the field.

The adjustment nut 56 illustrated in the figures is a two-part split locking nut as illustrated in FIG. 9. The adjustment nut 56 thus comprises first and second parts 57 and 58 that connect together by bolts 59 that are circumferential or tangential extending bolts and each of the first and second parts 57 and 58 have an internal thread so that when connected together, the nut can be threaded up or down the shaft 22. The split form of the nut 56 advantageously allows the nut 56 to be applied to the shaft 22 at any point along its length without needing to thread the nut from the top or bottom of the shaft 22.

The adjustment nut 56 will rotate with the shaft 22 if it is left in place on the shaft 22. The adjustment nut 56 can be left in place on the shaft 22 so that it is always available, but it can easily be removed from the shaft 22 and repositioned when required to adjust the position or height of another blade assembly 26 of the pruning machine 12. An alternative is to have an adjustment nut 56 for each blade assembly 26 of the pruning machine 12. The adjustment nut 52 can alternatively be a standard nut that is fitted to the shaft 22 when the blade assemblies 26 are fitted and such a nut can be associated with each of the blade assemblies 26 that are attached to the shaft 22.

The invention of this application requires a threaded shaft, which is unique in the field of pruning machines, but which facilitates the use of an adjustment nut for raising and lowering blade assemblies. As will be apparent from the discussion above, the use of an adjustment nut offers significant benefits over prior art machines.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A pruning machine for pruning vegetation growing on generally horizontal support wires, the machine including a vertical shaft mounted for rotation and at least one blade assembly mounted on the shaft, the blade assembly including a plurality of blades mounted to rotate with the shaft, the vertical shaft being threaded at least in the region where the blade assembly is mounted, the vertical position of the blade assembly on the shaft being adjusted between two pruning positions by a respective one of one or more adjustment nuts which threadably engages the threaded shaft below the blade assembly and which during adjustment, bears against the underneath of the blade assembly so that rotation of the nut upwardly of the shaft raises the blade assembly and rotation of the nut downwardly allows the blade assembly to lower.

2. A pruning machine according to claim 1, the shaft being threaded substantially along its full length.

3. A pruning machine according to claim 2, the shaft having one or both ends as unthreaded ends and being threaded fully between each end.

4. A pruning machine according to claim 1, at least two blade assemblies being mounted on the shaft and a respective one of said one or more adjustment nuts being located beneath each of the blade assemblies.

5. A pruning machine according to claim 1, four or more blade assemblies being mounted on the shaft and a respective one of said one or more adjustment nuts being located beneath each of the blade assemblies.

6. A pruning machine according to claim 1, the adjustment nut being formed in two connectable parts that can be connected together and disconnected.

7. A pruning machine according to claim 6, the two connectable parts being connected together by circumferential or tangential extending bolts.

8. A pruning machine according to claim 1, the blade assemblies comprising a first set of blades that rotate in a first plane and a second set of blades that are stationary in a second plane relative to the first set, the first and second planes being generally parallel and closely adjacent and the first set of blades overlying the second set of blades.

9. A pruning machine according to claim 8, the first set of blades being connected to a first rotatable pruning plate and the blades protruding radially from the periphery of the first plate, the second set of blades being connected to a second stationary pruning plate and the second set of blades protruding radially from the periphery of the second plate, the first and second plates being mounted on the shaft coaxially.

10. A pruning machine according to claim 8, the arrangement of the first and second set of blades being such that rotation of the first plate relative to the second plate creates a scissor action between the blades of the first and second plates to cut vegetation that enters the space between the blades.

11. A pruning machine according to claim 9, the first plate being connected to the shaft to rotate with the shaft when the shaft rotates.

12. A pruning machine according to claim 11, the first plate being connected to the shaft by a locking nut or a retaining collar that can lock onto the shaft.

13. A pruning machine according to claim 12, the first plate being connected to the shaft by a split locking nut.

14. A pruning machine according to claim 9, the second plate having a central bearing through which the shaft extends so that the bearing rotates with the shaft.

15. A pruning machine according to claim 14, the second plate being connected to an arm that extends to a structural part of the pruning, machine, to maintain the second plate against rotation.

16. A pruning machine according to claim 14, a retaining collar underlying the second plate to support the second plate in position on the shaft.

17. A pruning machine according to claim 16, the retaining collar being fixed to the shaft so that it rotates with the shaft when the shaft rotates and bearing against an underneath surface of the central bearing so that it rotates with the central bearing when the shaft rotates.

18. A pruning machine according to claim 17, a respective one of said one or more adjustment nuts being threaded onto the shaft beneath the retaining collar and the respective adjustment nut being rotatable clockwise or anti-clockwise against a facing surface of the retaining collar to lift or lower the blade assembly when adjustment of the position of the blade assembly on the shaft is required.

19. A pruning machine according to claim 1, the vertical shaft being a first shaft and the pruning machine including a second vertical shaft and the first and second shafts being spaced apart laterally for positioning on either side of the vegetation to be pruned, each of the shafts being mounted for rotation and each having at least two blade assemblies mounted in vertically spaced relationship, the second shaft being threaded at least in the regions where the blade assemblies are mounted and the vertical position of the blade assemblies on the second shaft being adjusted by an adjustment nut which threadably engages the threaded shaft below the blade assemblies and which during adjustment, bears against the underneath of the blade assemblies so that rotation of the nut upwardly of the second shaft raises a blade assembly and rotation of the nut downwardly allows the blade assembly to lower.

20. A pruning machine for pruning vegetation growing on generally horizontal support wires, the machine including a pair of vertical shafts which are spaced apart laterally for positioning on either side of the vegetation to be pruned, each of the shafts being mounted for rotation and each of the shafts including at least two blade assemblies mounted on the shaft in vertically spaced relationship, each blade assembly including a plurality of blades mounted to rotate with the shaft, the vertical shafts being threaded at least in the region where the blade assemblies are mounted, and an adjustment nut being threadably mounted to the threaded region beneath each blade assembly, the vertical position of the blade assemblies on the shaft being adjusted by rotating the adjustment nut against the underneath of the blade assembly so that rotation of the nut upwardly of the shaft raises the blade assembly and rotation of the nut downwardly allows the blade assembly to lower.

* * * * *